(12) United States Patent
Barrau et al.

(10) Patent No.: US 10,345,622 B2
(45) Date of Patent: Jul. 9, 2019

(54) MANAGEMENT SYSTEM AND METHOD OF AN ACTIVE DEVICE

(71) Applicant: Essilor International, Charenton-le-Pont (FR)

(72) Inventors: Coralie Barrau, Charenton-le-Pont (FR); Nicolas La Villonniere, Charenton-le-Pont (FR); Thierry Villette, Charenton-le-Pont (FR); Benjamin Rousseau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 50 days.

(21) Appl. No.: 15/541,228

(22) PCT Filed: Dec. 29, 2015

(86) PCT No.: PCT/EP2015/081341
§ 371 (c)(1),
(2) Date: Jun. 30, 2017

(87) PCT Pub. No.: WO2016/107866
PCT Pub. Date: Jul. 7, 2016

(65) Prior Publication Data
US 2017/0351118 A1    Dec. 7, 2017

(30) Foreign Application Priority Data

Dec. 30, 2014    (EP) .................................... 14307206

(51) Int. Cl.
*G02C 7/10* (2006.01)

(52) U.S. Cl.
CPC ..................................... *G02C 7/101* (2013.01)

(58) Field of Classification Search
CPC ........... G02C 7/10; G02C 7/101; G02C 7/104
USPC ...... 351/158, 159.49, 159.59, 159.6–159.65, 351/159.73
See application file for complete search history.

(56) References Cited

U.S. PATENT DOCUMENTS

| 2003/0231293 A1 | 12/2003 | Blum et al. |
| 2010/0277687 A1 | 11/2010 | Shehadeh et al. |
| 2012/0215291 A1 | 8/2012 | Pugh et al. |

(Continued)

OTHER PUBLICATIONS

Patent Cooperation Treaty, International Search Report and Written Opinion, PCT Appln. No. PCT/EP2015/081341, dated Mar. 2, 2016.

*Primary Examiner* — Darryl J Collins
(74) *Attorney, Agent, or Firm* — Oblon, McClelland, Maier & Neustadt, L.L.P.

(57) ABSTRACT

The invention relates to the field of management systems and methods of an active device and more particularly, with said active device being an active ophthalmic lens, to a management system and method which allow a total or sufficient protection by taking into account the luminous environment of the wearer while avoiding some effects relative to permanent light filtering. According to a particular embodiment of the invention, there is also provided a monitoring of the wearer's health via active, regulated and continuous control of the active device, this control being performed for instance by a health professional via a remote monitoring system.

16 Claims, 3 Drawing Sheets

(56) References Cited

U.S. PATENT DOCUMENTS

Figure 1:
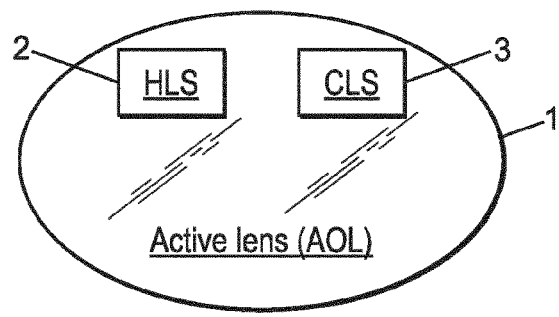

2013/0278989 A1* 10/2013 Lam .......................... B60J 3/04
359/275
2015/0323795 A1* 11/2015 Alton ................. G02B 27/0172
349/11

\* cited by examiner

MANAGEMENT SYSTEM AND METHOD OF AN ACTIVE DEVICE

The invention relates to the field of management systems and methods of an active device, such as an active ophthalmic lens.

According to one of its embodiment, the invention relates more particularly to a management system of an active ophthalmic lens comprising:
- an active ophthalmic lens comprising a light filter for selectively filtering a first range of the light spectrum,
- a sensor arranged to measure data relating to light within said first range reaching the active ophthalmic lens, and
- a control unit designed for activating said light filter in order to control the filtering of light within said first range according to data measured by the sensor.

Such a management system of an active ophthalmic lens is known from patent application US 2010/0277687 A1.

A drawback of the management system according to the above-referred patent application is at least that it does not allow both controlling the active ophthalmic lens according to different ranges of the light spectrum and/or collecting data relative to the exposure of the wearer's eye to these different ranges, in particular to establish a diagnosis by crossing these data.

In this context, the present invention provides a management system and method to overcome at least the above-mentioned drawback.

To this end, the management system of an active device according to the invention comprises:
- an active device comprising at least one light filter for filtering at least one among a first range and a second range of the light spectrum,
- a first sensor arranged to measure data relating to light within said first range and reaching, or transmitted through, the active device,
- a second sensor arranged to measure data relating to light within said second range and reaching, or transmitted through, the active device, and
- a control unit designed for activating said light filter and controlling at least one among:
  - the filtering of light within said first range according to data measured by the first and/or second sensors and
  - the filtering of light within said second range according to data measured by the first and/or second sensors.

When the active device is an active ophthalmic lens, the management system thus allows at least a total or sufficient protection by taking into account the luminous environment of the wearer or the light reaching the eye of the wearer, while avoiding some effects relative to permanent light filtering (incorrect vision of colors, bad aesthetics of the lens, chronobiological deregulation . . . ).

According to a preferred embodiment, said first range of the light spectrum comprises harmful blue light and said second range of the light spectrum comprises chronobiological blue light.

The management system thus allows an active and regulated filtering of harmful blue light and/or chronobiological blue light as a function of measured data relative to harmful blue light and/or chronobiological blue light.

According to a particular embodiment, the management system further comprises a storage unit of said measured data, the storage unit being designed for correlating at least said measured data relating to light within the first range with said measured data relating to light within the second range. The storage unit may be further designed for transmitting said measured data to a remote monitoring system.

The management system according to this particular embodiment thus allows a monitoring of health (such as retinal toxicity and circadian cycle) via potentially active, regulated and continuous control of the active device, this control being performed for instance by a health professional which accesses to said remote monitoring system. More particularly, the management system thus provides a personalized and optimized monitoring of blue light received by the eye through a potentially continuous control of the quantity and spectrum of blue light.

The control unit of the management system may more particularly comprise processing means and storage means. The storage means store some threshold values, such as phototoxicity and chronobiological threshold values. These threshold values may be determined at least on the basis of information about a person situated in the vicinity of the active device, such as a wearer of an active ophthalmic lens. Preferably, the threshold values are logically related to said first and second ranges of the light spectrum. The processing means may be designed for comparing said measured data with corresponding threshold values. Then the control unit is able to control the active device based on a result of the comparison.

According to another particular embodiment, with the active device being an active ophthalmic lens, the management system further comprises at least one among:
- a chronobiological marker sensor for measuring data relating to chronobiological characteristics of a wearer of the active ophthalmic lens,
- an actimetry sensor for measuring data relating to an activity of a wearer of the active ophthalmic lens, and
- a positioning system for measuring data relating to a location of a wearer of the active ophthalmic lens.

Then the control unit is able to take into account at least one of these supplementary measured data for controlling the active device.

Moreover, said threshold values may depend on at least one among said supplementary measured data. In such a case, each concerned sensor may be advantageously arranged to transmit its supplementary measured data to the storage means of the control unit and the processing means of the control unit may be further designed for determining said threshold values by taking into account for said supplementary measured data.

Then the control unit is able to collect at least one of these supplementary measured data for the purpose of monitoring of health and/or in order for the health professional to be able to establish a diagnosis further based on these supplementary measured data.

The present invention relates also to an eyewear comprising the above described management system and to an active device, comprising at least:
- a first sensor arranged to measure data relating to light within said first range and reaching, or transmitted through, the active device, and
- a second sensor arranged to measure data relating to light within said second range and reaching, or transmitted through, the active device.

The present invention further relates to a management method associated with the here above described management system.

The present invention relates furthermore to a computer program product stored on storage medium and executable by processing means of the above described management system, this computer program product having a sequence of instructions for implementing said associated management method.

The advantages achieved owing to the technical features of the here above described management system are also achieved owing to the other aspects of the present invention.

Figure 2:
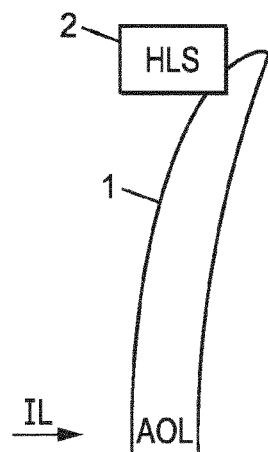
Figure 2:
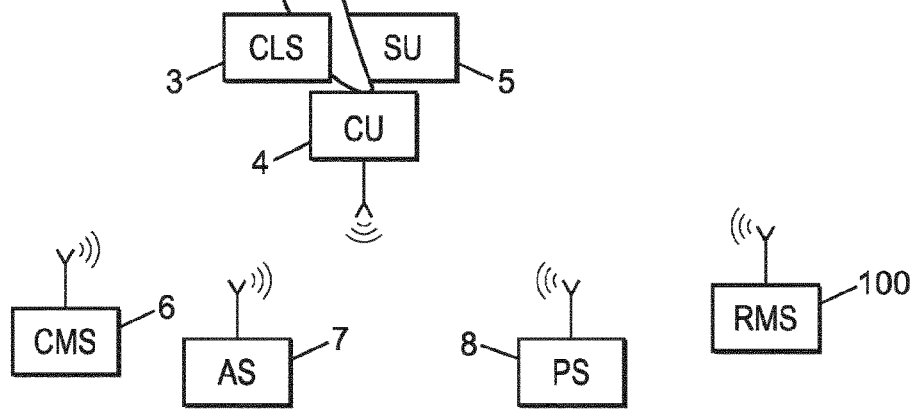
Figure 3:
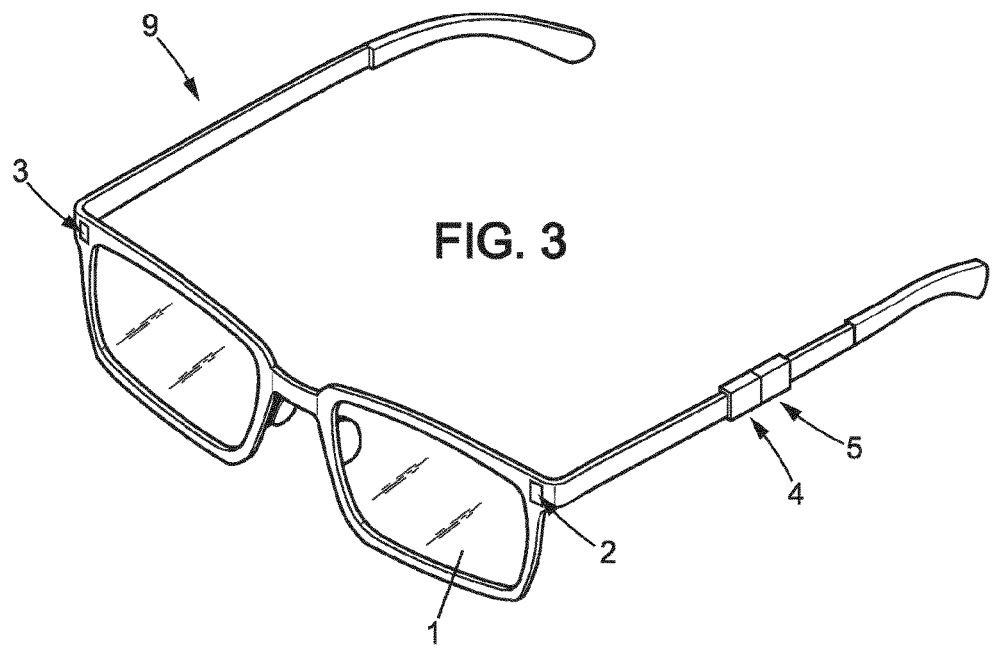
Figure 4:
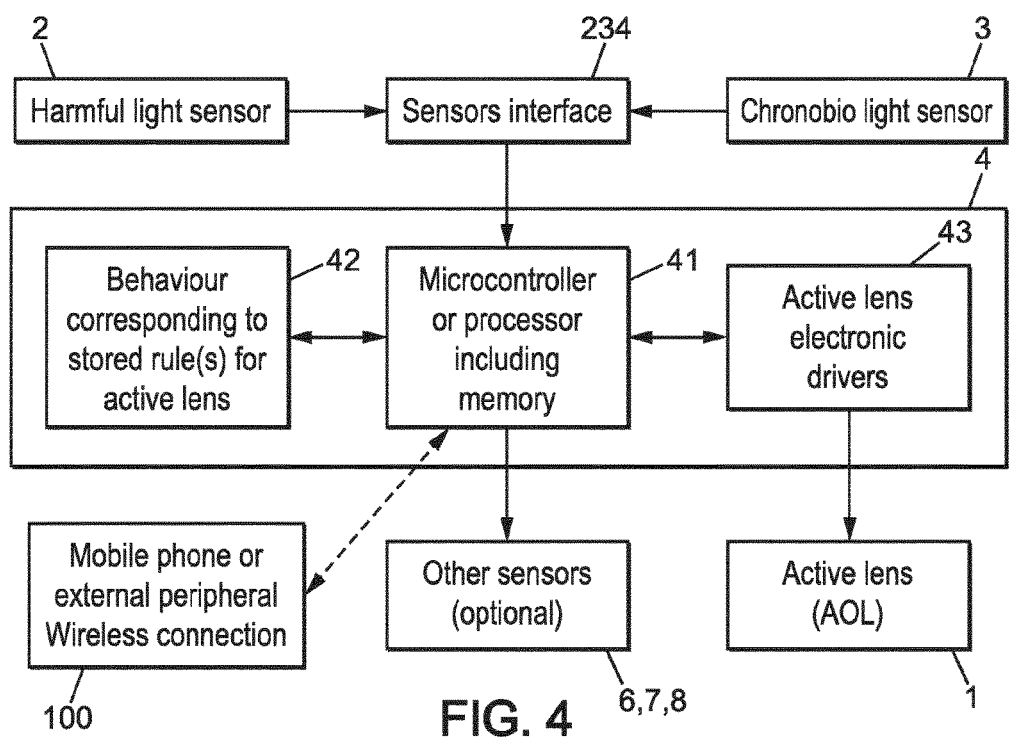
Figure 5:
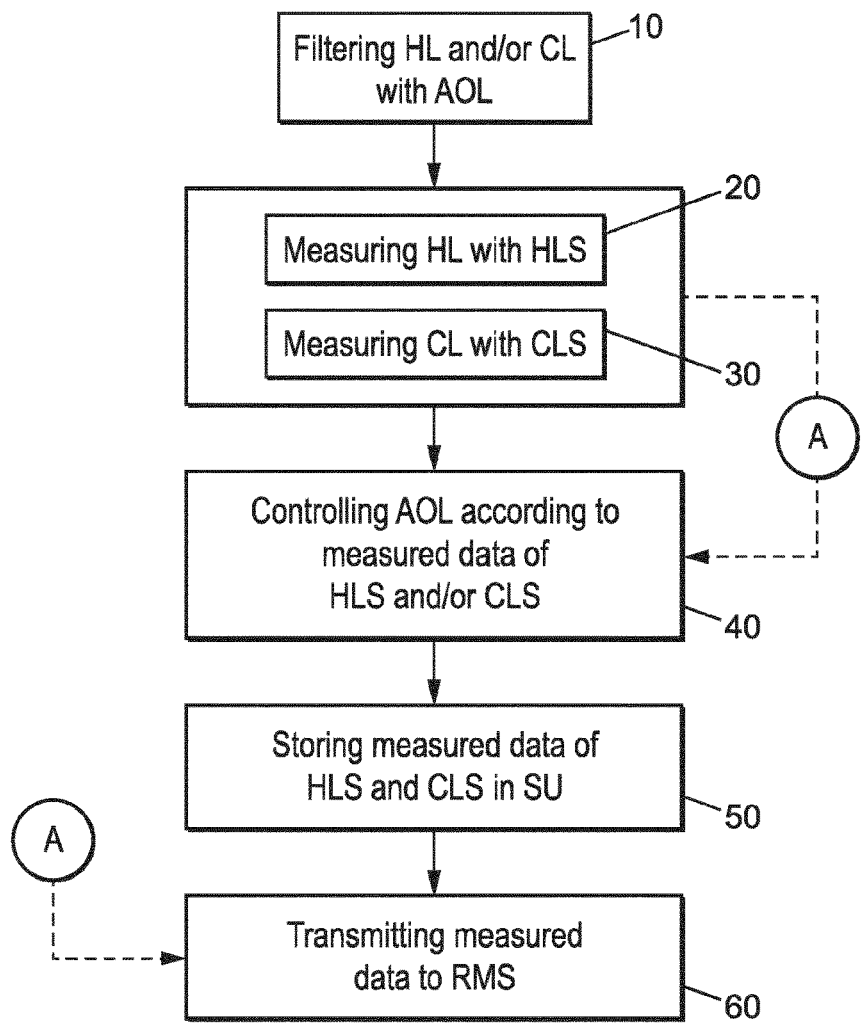
Figure 6:
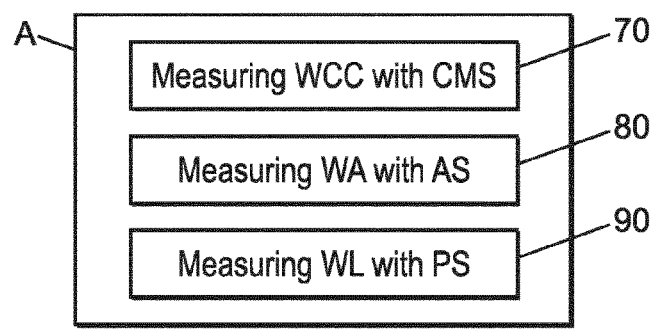

Other technical features or advantages of the present invention will clearly stand out from the detailed description which is done below, by way of example and for purposes of illustrative discussion of embodiments of the invention, with specific reference to the accompanying drawings, in which:

FIG. 1 is a schematic front view of a first embodiment of an active ophthalmic lens of the management system according to the present invention, FIG. 2 is a schematic sectional view of a second embodiment of an active ophthalmic lens of the management system according to the present invention, FIG. 3 is a perspective view of an eyewear comprising an embodiment of the management system according to the present invention, FIG. 4 shows hardware synoptic of an embodiment of the management system according to the present invention, FIG. 5 shows a flowchart for an embodiment of the management method according to the present invention, and FIG. 6 shows details of box (A) shown on FIG. 5.

The present invention may be helpful with many kind of active devices, such as a device through which light is dedicated to be transmitted (an ophthalmic lens, a light cover, etc.) or a light emitting device (for instance a light bulb, a screen, etc.). Anyway, each of these active devices is able to change its state according to the environment or a manual or automatic control.

Thus, despite the fact that, for convenience, the detailed description given here below considers mainly the embodiment according to which the active device is an active ophthalmic lens, the invention should not be regarded as inevitably limited to this particular embodiment.

Furthermore, in the sense of the present invention, an active ophthalmic lens should not be regarded as limited to an active lens dedicated to cure eye's disease. Indeed, an active ophthalmic lens as considered in the present invention may encompass lenses of spectacles which do not have any kind of therapeutic effect, like eyeshade or sunshade.

Moreover, the ophthalmic lens may be a corrective or not corrective lens.

The operating mode of such an active ophthalmic lens may be completely predefined if the active ophthalmic lens has a simple function. For instance, an electrochromic lens may obey an on/off order given by the wearer. Alternatively, the operating mode of such an active ophthalmic lens may be adapted to a setting, notably if several active lenses (e.g. electrochromic and polarizer) are simultaneously used, and/or if the use of the active ophthalmic lens is expected to depend on several parameters, such as data measured by a sensor and/or the time of day and/or the type of activity of the wearer (sport, study, reading, domestic activity . . . ).

Referring to FIGS. 4 and 5, an embodiment of the management system according to the present invention may comprise:

an active ophthalmic lens (AOL) 1 comprising at least one light filter for filtering 10 at least one among a first range and a second range of the light spectrum, a first sensor 2 arranged to measure 20 data relating to light within said first range of the light spectrum, a second sensor 3 arranged to measure 30 data relating to light within said second range of the light spectrum, and a control unit (CU) 4 designed for activating 40 said active ophthalmic lens in a controlled and regulated manner.

There are different kinds of active ophthalmic lenses. They generally change their state or behavior according to an external order. For instance, some active ophthalmic lenses are controlled by electrical activation.

The active ophthalmic lens 1 may comprise several layers corresponding to several functions. These functions may comprise:

a change in power, for example with a soft lens or a liquid crystal system, to provide distance or near vision depending on the circumstances, a phase change, for example with polarizers, to provide a polarization of light, a spectral change, for example harmful and/or chronobiological blue light blocking, a change in light intensity, for example with an electrochromic effect, to adapt the intensity of the light reaching the eye, for example to better visualize a screen placed in front of the eye for virtual reality applications, and a light generation, for example with a source of light, for applications of light therapy, to deliver on the eye a low intensity light for therapeutic purposes.

More specifically, said at least one filter of the active ophthalmic lens 1 may comprise at least one light filter for selectively filtering 10 at least one among said first and second ranges of the light spectrum. For instance, it may filter harmful blue light or chronobiological blue light or both at the same time or at different times. To this end, the filter may be constituted of cholesteric phase liquid crystals introduced into a cell formed by two substrates made in mineral glass or in optically transparent plastic. One or both of the substrates bear transparent conductive electrodes. These electrodes are used to apply an electric field which varies the orientation of the liquid crystals, thus changing the profile of the spectral filter (selectivity and efficiency).

Referring to FIGS. 1 and 2, the first sensor 2 is arranged to measure data relating to light within the first range potentially filtered by the active ophthalmic lens and the second sensor 3 is arranged to measure data relating to light within said second range potentially filtered by the active ophthalmic lens. The first and second sensors 2, 3 may be positioned outwardly to sense the incident light (IL) reaching the active ophthalmic lens. The first and second sensors 2, 3 may thus measure data relating to said incident light. It can be useful, notably for an application to light therapy, to estimate the light reaching the eye of the wearer. The quantity of light provided to the eye will be better managed if the light which reaches the eye is taken into account.

Each of the first and second sensors 2, 3 may comprise a micro-spectrometer, a combination of photodiodes and of band-pass/dichroic micro-filters, a fluorescent/phosphorescent photosensitive material in the range(s) of desired wavelength(s).

Each of the first and second sensors 2, 3 may continuously measure:

an instantaneous intensity of the light, an amount of light during a defined extended period of time.

According to a preferred embodiment of the management system and method, said first range of the light spectrum may comprise harmful blue light and said second range of the light spectrum may comprise chronobiological blue light. In this case, the first and second sensors 2, 3 may be called, here below or on the attached drawings, the harmful light sensor (HLS) and the chronobiological light sensor (CLS), respectively.

Harmful blue light corresponds to light with wavelengths comprise between 400 and 460 nm, preferably between 415 and 455 nm. These wavelengths are involved in the progressive degeneration of cells in the retinal pigment epithelium (RPE), and by extension chronic exposure to these wavelengths is a risk factor in the onset of age-related macular degeneration (AMD or ARMD) or other macular pathologies.

Chronobiological blue light corresponds to light with wavelengths comprise between 465 and 520 nm, preferably between 465 and 495 nm. These wavelengths absorbed by intrinsically photosensitive retinal ganglion cells (ipRGC) are involved in regulating many non-visual biological functions, including the sleep-wake cycle, the pupillary reflex, the cognition, the mood, the body temperature . . . . Proper modulation of chronobiological blue light is thus essential for proper synchronization of chronobiological rhythms.

Referring further to FIG. 3, the first and second sensors 2, 3 may be disposed directly on the front face of the active ophthalmic lens 1 or on the front face of the spectacle frame of an eyewear 9, as well as accommodated therein.

The first and second sensors 2, 3 may also be moved and connected to an end of an optical waveguide, the other end of said optical waveguide being positioned outwardly to transmit the incident light reaching the active ophthalmic lens. Thus, when an optical waveguide is further used, the first and/or second sensors may be placed on the sidepiece (or bow) of the eyewear 9, for instance in vicinity of the control unit 4 potentially arranged on the sidepiece of the eyewear.

The sensors may also be placed behind the active ophthalmic lens and may be preset to simulate the characteristics and functioning of the wearer's eye.

As illustrated on FIGS. 3 and 5, the management system may also comprise a storage unit 5. This latter may be designed for storing 50 said measured data in a correlated manner. More particularly, data measured by said first and second sensors 2, 3, and potentially data measured by some supplementary sensors 6, 7, 8, are stored in a crossed manner in order for the health professional to be able to establish a diagnosis based on such crossed information. For the simplest example, said measured data are each stored with time indexing. For another example, the harmful and chronobiological light sensors are designed for computing the amount of harmful and chronobiological light received during a determined period of time starting from a determined time, and the measured data are stored together with data relative to the starting point and the period of time to which they correspond. For a further example, the data may be stored according to a determined format in order to form a formatted file to be used for instance as an input for a program stored in the control unit or as an input for a health monitoring application.

The storage unit 5 may be passive, that is only designed to receive and stored data measured by the sensors. It may then be read occasionally (for instance on the occasion of medical examinations) by an adapted reader which may be disposed at the health professional's premises. The storage unit 5 may also be active, that is designed for transmitting 60 said measured data to a remote monitoring system 100 and/or for communicating said measured data to the control unit 4.

Thus the management system further allows long-term recording and transfer of certain key parameters for continuous health monitoring by the physician and/or the patient.

FIG. 4 shows hardware synoptic of an embodiment of the management system according to the present invention.

As illustrated on FIG. 4, the first and second sensors 2, 3 are indeed connected to an electronic device called control unit 4 that is designed for activating/driving/controlling 40 the active ophthalmic lens according to a particular method. This latter is for instance a method adapted to the wearer and/or to the light modification allowed by the active ophthalmic lens.

The connection between the sensors 2, 3 and the control unit 4 may be a wired or wireless connection. This connection may further involve a sensor interface 234. The sensors interface may alternatively be part of the control unit 4.

The control unit 4 allows to enslave the operation of the active ophthalmic lens notably as a function of the light flux reaching the active ophthalmic lens and regarding the function(s) of the active ophthalmic lens. The control unit is designed for controlling 40 the active ophthalmic lens at least according to data measured by the first and/or second sensors 2, 3. The control unit 4 may be more particularly designed for controlling at least one among:
   the filtering of light within said first range according to data measured by the first and/or second sensors and
   the filtering of light within said second range according to data measured by the first and/or second sensors.

The measurement made by at least one of the sensors 2, 3 then enables the filter to be activated in at least two ways:
   an on/off activation when the measurement exceeds a predefined threshold value according to a predetermined level of filtering, and
   an intensity of the filtering inversely proportional to a measured dose or intensity of light (not an all-or-nothing operation mode, but a continuous filtering of progressive intensity).

Always as illustrated on FIG. 4, the control unit 4 may comprise processing means 41. These latter are not detailed, but may be any of common components used to design electronic systems, such as for example STM32 or Kinetis microcontroller or iMX6 processor. Said processing means may be designed for comparing said measured data with corresponding threshold values, in order to consequently control the active ophthalmic lens.

The control unit 4 may also comprise interfacing means 234, 43. For instance, a sensor interface 234 may allow to functionally interface the first and second sensors 2, 3. For another example, active lens electronic driver(s) 43 may allow driving the activation of the active ophthalmic lens, for instance by delivering suitable electrical signal(s) to the active ophthalmic lens. The interfacing means 234, 43 are not detailed, but may be any of common interfaces used to design electronic systems, such as for example I²C bus, Mipi interface, or any wired or wireless communication between components, The control unit 4 may further comprise data storing means 42. Said data storing means 42 are not detailed, but may be any of common non-transitory storage medium used to design electronic systems, such as for example SRAM memory, Flash memory, etc. The data storing means 42 may be provided for storing said program and potentially the precedent and current state of the active ophthalmic lens (polarizer on/off, filter on/off . . . ). Said storage means may further be designed for storing the threshold values to be compared to said measured data by the processing means of the control unit. The data storing means 42 of the control unit 4 may further play the role of the above described storage unit 5, or inversely.

At least some of said threshold values are logically related to said first and/or second ranges of the light spectrum. For instance, phototoxicity and chronobiological thresholds are logically related to the amount of harmful blue light received by the eye and the amount of chronobiological blue light received by the eye, which in turn are proportional to data measured by the harmful light sensor (HLS) and the chronobiological light sensor (CLS). For another example, several phototoxicity thresholds may be defined, such as a maximum daily and/or weekly and/or monthly and/or quarterly dose and a maximum of illumination of harmful blue light allowed on a short period of time.

It should be noted that, in the case where the filter of the active ophthalmic lens is not selective about harmful blue light, it is interesting to take into account measured data of the chronobiological blue light sensor. The activation of the filter of blue light may then take into account for the need to receive enough chronobiological blue light. More particularly, a minimum threshold of chronobiological blue may have to be received before filtering blue light among which harmful blue light.

Said threshold values may be defined, and updated if necessary, based on various types of information. They may be determined by a practitioner who may input them in data storing means 42 of the control unit 4 or they may be determined automatically by some calculus which for instance may be performed by the processing means 41 of the control unit according to the program stored therein. These threshold values must preferably be able to evolve in response to measured environmental parameters (especially luminous environment) and potential evolution of said various types of information.

The control of the active ophthalmic lens performed by the control unit 4 depends on these threshold values and thus their determination requires knowledge of intrinsic information about the wearer, in order to provide a customized configuration of the management system.

Such intrinsic information about the wearer may comprise:
- the professional activity and/or the lifestyle of the wearer: frequent traveler, night worker, outdoor worker . . . . For instance, these parameters affect the time of day and frequency during which it is necessary to filter the chronobiological blue light as well as the required efficiency of such a filtering;
- the wearer's age on the one hand has influence on retinal photosensitivity and pupil diameter on which depend the amount of light received by the eye (linear dependence), on the other hand affects the cycle of physiological sleep (phase shift to a morning chronotype profile, etc.);
- the results of a medical examination (general and particularly ocular, retinal),
- the specific sensitivity of the wearer's retina,
- the genetic predispositions of the wearer, for instance relative to age-related macular degeneration (AMD or ARMD),
- the aggravating factors (smoking, eating habits, . . . ).

Some other threshold values may then be defined which depend on said intrinsic information about the wearer. In an illustrative way, it is known that the control of chronobiological blue light must take into account the time of day: exposure to chronobiological blue light should be stronger in the first part of the day for alertness, mood, cognition, while in the evening, excessive chronobiological light can disrupt sleep.

For instance, there may be defined a minimum daily dose to be achieved over a period of time taking into account the physic-chronobiological cycle of the wearer; typically in the morning for a day worker. If this dose is not reached during the recommended time, the management system may trigger an alert to the practitioner and/or the wearer and indicate the missing dosimetry for it to be provided by light therapy, medication or alternative pathway. There is thus provided a system for warning, monitoring and indicating the dosimetry for dealing with therapeutic treatment of timing schedule of circadian cycle.

For another example, there may be defined a maximum daily dose to be achieved over a determined period of time taking into account the physio-chronobiological cycle of the wearer; typically in the evening for a night worker.

For a further example, there may be defined a maximum illumination to be achieved per time unit over a period of time while taking into account the physio-chronobiological cycle of the wearer; typically in the evening for a night worker.

The threshold values of periodic dose or occasional intensity may thus be customized to the wearer. They may change at least partially as a function of time of day and geolocation in a predetermined and progressive manner. In an alternative or supplemental manner to the customized and/or variable threshold values, it is envisaged to manage the emission of light, notably chronobiological blue light, towards the eyes of a person, notably in order to revitalize this person.

A total protection or a protection of sufficient intensity is thus achieved by taking into account the luminous environment and some intrinsic information about the wearer to avoid harmful effects of a continuous or too high (relative to need) filtering. There may be among these harmful effects some color vision troubles, chronobiological troubles, bad aesthetics glass effects. For instance there may be provided the activation of a notch or tinted filter of blue light only when blue light is present and dangerous.

Always as illustrated on FIG. 4, the control unit 4 may further comprise supplementary sensors or be communicatively connected to such supplementary sensors 6, 7, 8, with at least one of these latters being or not comprised in an external device 100.

As illustrated on FIG. 2 and with references to FIG. 6, the supplementary sensors may be at least one among:
- a chronobiological marker sensor (CMS) 6, for measuring 70 data relating to wearer's chronobiological characteristics (WCC); such data may comprise body temperature, sweating, blood pressure, heart rate, eye movements, pupil size, sensitivity of the pupil (for instance by using electrooculography or eye tracking with a camera), etc.;
- an actimetry sensor (AS) 7, such as displacement sensors, accelerometers, gyroscopes, etc., for measuring 80 data relating to a wearer's activity (WA), such as walking, running, standing or sitting . . . ; and
- a positioning system (PS) 8, such as GPS position sensors or magnetometers, for measuring 90 data relating to a wearer's location (WL).

The chronobiological marker sensor 6 may more particularly allow a continuous monitoring of the pupil diameter in order to refine the measurement of retinal exposure to harmful blue light.

The actimetry sensor 7 may more particularly allow following the cycle of physiological sleep of the wearer and continuously (item every minute) evaluate its vigilance and sleep quality. Indeed, this evaluation may be important; for instance, the amount of chronobiological blue light that a wearer received may have an influence on its cycle of physiological sleep, and the activation of active ophthalmic lens may be tuned by the control unit to provide the wearer with a better physiological sleep.

The positioning system 8 may more particularly allow identifying situations where the sleep time should be modified in order to avoid jet lag.

The choice of the supplementary sensors 6, 7, 8 and/or supplementary data to be used may depend on required medical applications of the management system. For instance, active and regulated filtering of harmful blue light depends on the luminous environment, but can also advantageously depend on physiological data of the wearer and its activity. For another example, active and regulated filtering of chronobiological blue light depends on the luminous environment, but can also advantageously depend on the time of day, physiological data of the wearer and its activity. A personalized and optimized management of light received by the eye through a continuous monitoring of its quantity and spectrum as a function of the activity of the wearer, the time of day, the intrinsic parameters of the wearer is thus achieved.

Then the control performed by the control unit 4 may be set according to collected information about the wearer and/or may be performed by taking into account at least one of the data measured by said supplementary sensors 6, 7, 8 for controlling the active ophthalmic lens.

As illustrated on FIG. 4, wired or wireless connection of the control unit 4 to a remote management system 100, as an external device or via such an external device, is also possible.

Said external device 100 may comprise its own processing means, and thus the management of the active ophthalmic lens 1 may be at least partially performed by the use of the processor of such an external device; consequently, the control unit advantageously may need less processing resources. The decision and way to activate the active ophthalmic lens may thus be determined locally (by the control unit) and/or remotely (by the external device). Said external device may be mobile and follow the wearer, like a mobile phone, a smartphone, a control pad, a iPad or a graphics pad, or may be relatively immobile, like a computer installed in a health professional's premises or in wearer's home.

Said external device 100 may get information about the wearer's environment and, if appropriate, about the wearer himself (activity, health test, agenda . . . ). This device may comprise at least one of the above mentioned supplementary sensors 6, 7, 8. Thus at least one of these supplementary information or measured data may be taken into account in controlling the active ophthalmic lens. The management system according to this particularity may also take advantage of the human machine interface provided by such external devices, for instance in order to inform the wearer from the necessity of providing a chronobiological treatment by light and/or drugs therapy.

Wireless connection of the control unit 4 to the Internet is also possible, for instance via the external device 100. In such a case, on the one hand regulation of the active ophthalmic lens may be done with information about the wearer and his environment coming from the internet, on the other hand the management of the active ophthalmic lens, notably based on measured data, may be continuously determined and controlled by a remote management system (RMS) comprised in an Internet server, with this latter being accessible for instance by a health professional.

Moreover, since at least one of the above mentioned threshold values may further depend on at least one among the above mentioned supplementary measured data, each concerned supplementary sensor may be arranged to transmit, for instance via some communication means of the external device 100 in which they are arranged, its supplementary measured data to said storage means 42 of the control unit, in order for the processing means 41 thereof to be able to determine the threshold values by taking into account for the relevant supplementary measured data.

Other embodiments may be envisaged which are in the scope of the appendix claims. For instance, while the sensors are ideally as close as possible to the eye of the wearer, it may also be considered a management system wherein the sensors are not board on glasses or spectacles but are remotely arranged. The controlled active filters may also be arranged on any kind of light source of the environment (screen, bulb . . . ); thus the management system and method according to the present invention may also be used to control all light sources with active filters in a room or may serve as a warning system for monitoring posted worker in its environment and activity.

The invention claimed is:

1. A management system of an active device comprising:
an active device comprising at least one light filter for filtering at least one among a first range and a second range of a light spectrum;
a first sensor arranged to measure data relating to light within said first range and reaching, or transmitted through, the active device;
a second sensor arranged to measure data relating to light within said second range and reaching, or transmitted through, the active device;
control circuitry configured to activate said light filter and control at least one of:
the filtering of light within said first range according to data measured by at least one of the first and second sensors, and
the filtering of light within said second range according to data measured by at least one of the first and second sensors; and
a memory configured to store said measured data, the storing correlating at least said measured data relating to light within the first range with said measured data relating to light within the second range.

2. The management system according to claim 1, wherein said first range of the light spectrum comprises blue light corresponding to light with wavelengths between 400 and 460 nm and said second range of the light spectrum comprises chronobiological blue light.

3. The management system according to claim 1, wherein the circuitry is further configured to control transmitting said measured data to a remote monitoring system.

4. The management system according to claim 1, wherein the control circuitry is further configured to
control storage of threshold values determined at least on a basis of information about a person situated in a vicinity of the active device and logically related to said first and second ranges of the light spectrum, and
compare data measured by the active device with corresponding threshold values, in order to consequently control the active device.

5. The management system according to claim 4, wherein said threshold values comprise phototoxicity and chronobiological threshold values.

6. The management system according to claim 5, wherein the active device is an active ophthalmic lens, the management system further comprising at least one of:
- a chronobiological marker sensor for measuring data relating to chronobiological characteristics of a wearer of the active ophthalmic lens;
- an actimetry sensor for measuring data relating to an activity of the wearer of the active ophthalmic lens; and
- a positioning system for measuring data relating to a location of the wearer of the active ophthalmic lens, in order for the control circuitry to take into account at least one of supplementary measured data for controlling the active ophthalmic lens,
- the supplementary measured data comprising data relating to the chronobiological characteristics of the wearer of the active ophthalmic lens, data relating to the activity of the wearer of the active ophthalmic lens, and data relating to the location of the wearer of the active ophthalmic lens.

7. The management system according to claim 6, wherein, with said threshold values further depending on at least one among said supplementary measured data, wherein each of the chronobiological marker sensor and the actimetry sensor is arranged to transmit the supplementary measured data measured by said sensor to the control circuitry, and wherein said control circuitry is further configured to determine said threshold values by taking into account for said supplementary measured data.

8. The management system of claim 1, wherein said management system is a component of an eyewear.

9. A management method of an active device comprising:
- filtering, with an active device comprising at least one light filter, at least one among a first range and a second range of a light spectrum,
- measuring data relating to light within said first range and reaching, or transmitted through, the active device, with a first sensor of the active device;
- measuring data relating to light within said second range and reaching, or transmitted through, the active device, with a second sensor of the active device;
- activating said light filter, with control circuitry of the active device;
- controlling, with the control circuitry, at least one of:
  - the filtering of light within said first range according to data measured by at least one of the first and second sensors, and
  - the filtering of light within said second range according to data measured by at least one of the first and second sensors; and
- storing the measured data, in a memory arranged thereto, by correlating at least said measured data relating to light within the first range with said measured data relating to light within the second range.

10. The management method according to claim 9, wherein said first range of the light spectrum comprises blue light corresponding to light with wavelengths between 400 and 460 nm and said second range of the light spectrum comprises chronobiological blue light.

11. The management method according to claim 9, further comprising:
- transmitting said measured data measured by the active device to a remote monitoring system, with the storage being designed therefor.

12. The management method of claim 9, further comprising, with the control circuitry, processing and storing threshold values determined at least on a basis of information about a person situated in a vicinity of the active device and logically related to said first and second ranges of the light spectrum, and
wherein controlling the active device comprises: comparing data measured by the active device with corresponding threshold values to consequently control the active device.

13. The management method according to claim 12, wherein said threshold values comprise phototoxicity and chronobiological threshold values.

14. The management method according to claim 13, wherein the active device is an active ophthalmic lens, the method further comprising:
- measuring data relating to chronobiological characteristics of a wearer of the active ophthalmic lens, with a chronobiological marker sensor of the active device;
- measuring data relating to an activity of the wearer of the active ophthalmic lens with an actimetry sensor of the active device; and
- measuring data relating to a location of the wearer of the active ophthalmic lens with a positioning system,
- in order for the control unit to take into account at least one of supplementary measured data for controlling the active ophthalmic lens,
- wherein the supplementary measured data comprising data relating to the chronobiological characteristics of the wearer of the active ophthalmic lens, data relating to the activity of the wearer of the active ophthalmic lens, and data relating to the location of the wearer of the active ophthalmic lens.

15. The management method according to claim 14, further comprising determining said threshold values based on at least one among said supplementary measured data, said supplementary measured data having been transmitted by each of the chronobiological marker sensor and the actimetry sensor.

16. A non-transitory computer readable storage medium having instructions recorded thereon, which when executed by a processor of a management system, cause the processor to perform operations comprising:
- filtering, with an active device of the management system having at least one light filter, at least one among a first range and a second range of a light spectrum,
- measuring data relating to light within said first range and reaching, or transmitted through, the active device, with a first sensor of the active device;
- measuring data relating to light within said second range and reaching, or transmitted through, the active device, with a second sensor of the active device;
- activating said light filter, with a control unit of the management system;
- controlling at least one of:
  - the filtering of light within said first range according to data measured by at least one of the first and second sensors, and
  - the filtering of light within said second range according to data measured by at least one of the first and second sensors; and
- storing the measured data, in a memory arranged thereto, by correlating at least said measured data relating to light within the first range with said measured data relating to light within the second range.

* * * * *